(12) United States Patent
Lee

(10) Patent No.: US 8,035,625 B2
(45) Date of Patent: Oct. 11, 2011

(54) TOUCH SCREEN

(75) Inventor: Yu-Sheop Lee, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 761 days.

(21) Appl. No.: 11/937,523

(22) Filed: Nov. 9, 2007

(65) Prior Publication Data

US 2008/0111797 A1  May 15, 2008

(30) Foreign Application Priority Data

Nov. 15, 2006 (KR) .................. 10-2006-0112790

(51) Int. Cl.
*G06F 3/042* (2006.01)
(52) U.S. Cl. .............. 345/175; 345/173; 178/18.03; 178/18.09
(58) Field of Classification Search .......... 345/173–178; 178/18.01, 18.03, 18.09, 18.11
See application file for complete search history.

(56) References Cited

U.S. PATENT DOCUMENTS

| | | | | |
|---|---|---|---|---|
| 4,346,376 A * | 8/1982 | Mallos | ............ | 345/176 |
| 4,542,375 A * | 9/1985 | Alles et al. | ............ | 345/176 |
| 5,196,835 A * | 3/1993 | Blue et al. | ............ | 345/175 |
| 5,734,375 A * | 3/1998 | Knox et al. | ............ | 345/168 |
| 5,786,810 A * | 7/1998 | Knox et al. | ............ | 345/168 |
| 5,909,210 A * | 6/1999 | Knox et al. | ............ | 345/168 |
| 6,008,798 A * | 12/1999 | Mato et al. | ............ | 345/168 |
| 6,100,538 A * | 8/2000 | Ogawa | ............ | 250/559.29 |
| 6,515,740 B2 * | 2/2003 | Bamji et al. | ............ | 356/141.1 |
| 6,674,424 B1 * | 1/2004 | Fujioka | ............ | 345/157 |
| 6,690,354 B2 * | 2/2004 | Sze | ............ | 345/156 |
| 6,707,027 B2 * | 3/2004 | Liess et al. | ............ | 250/221 |
| 6,906,793 B2 * | 6/2005 | Bamji et al. | ............ | 356/141.1 |
| 7,283,214 B2 * | 10/2007 | Xu et al. | ............ | 356/5.15 |
| 7,305,368 B2 * | 12/2007 | Lieberman et al. | ............ | 706/14 |
| 7,307,661 B2 * | 12/2007 | Lieberman et al. | ............ | 348/333.1 |
| 7,342,574 B1 * | 3/2008 | Fujioka | ............ | 345/175 |
| 7,557,795 B2 * | 7/2009 | Kong et al. | ............ | 345/156 |
| 7,705,835 B2 * | 4/2010 | Eikman | ............ | 345/176 |
| 2004/0108990 A1 * | 6/2004 | Lieberman et al. | ............ | 345/156 |
| 2006/0072118 A1 * | 4/2006 | Chan et al. | ............ | 356/495 |
| 2006/0114237 A1 * | 6/2006 | Crockett et al. | ............ | 345/173 |
| 2006/0227120 A1 * | 10/2006 | Eikman | ............ | 345/175 |

FOREIGN PATENT DOCUMENTS

KR  2001-51563  6/2001

\* cited by examiner

*Primary Examiner* — Amare Mengistu
*Assistant Examiner* — Dmitriy Bolotin
(74) *Attorney, Agent, or Firm* — Cha & Reiter, LLC

(57) ABSTRACT

A touch screen includes a display screen having an upper surface that provides picture information, and an optical module that emits rays in directions that can be parallel with the upper surface of the screen. When an object, such as a stylus, pen or a finger is placed on the screen to select a portion of the picture information provided on the screen, at least a portion of the rays are reflected off of the object and detected in order to determine a position of the object on the screen. The position of the object can be calculated in various ways including calculating a position of the object based on a phase delay of the reflected rays, or based on an intensity of the reflected rays, or based on an incidence angle of the reflected rays.

18 Claims, 11 Drawing Sheets

TOUCH SCREEN

CLAIM OF PRIORITY

This application claims priority from an application entitled "Touch Screen" filed in the Korean Intellectual Property Office on Nov. 15, 2006 and assigned Serial No. 2006-112790, the contents of which are hereby incorporated by reference in its entirety.

BACKGROUND OF THE INVENTION

1. Field of the Invention

The present invention relates to a touch screen, and more particularly, to a touch screen which is operational based on optical characteristics.

2. Description of the Related Art

Touch screens have become increasingly popular because information that is pictorially provided to a user is preferred over hard keyboards or keypads. In addition, touch screens serve as an input device not only by pressing response prompts for inputting information, but also include menu buttons displayed on the screen by which the user can select specific information or character buttons where they can type specific characters. Accordingly, touch screens are used in various kinds of apparatuses such as machinery and equipment in industry, including but not limited to personal portable terminals, and automated-teller machines.

There are typically four types of touch screen classifications into which most touch screens can be largely classified, such as a resistance film type touch screen, an electrostatic capacity type touch screen, an ultrasonic wave reflection type touch screen, and an optical type touch screen using infrared light, etc.

For example, the resistance film type touch screens and the electrostatic capacity type touch screens determine a position on the touch screens that has been selected by a user based on resistance and electrostatic capacity. The resistance and electrostatic capacity are obtained when a point of contact is generated by the user touching a portion of the display.

In addition, the ultrasonic wave reflection type touch screens and the optical type touch screens function by the formation of an array, which is a kind of a lattice, of ultrasonic waves or rays. The ultrasonic wave reflection and optical type touch screen determine a position on their respective screen, which is selected by the user, based on the detection of rays on the lattice.

FIG. 1 is a schematic view illustrating a conventional structure of an optical type touch screen. Referring to FIG. 1, the conventional touch screen 100 has a lattice 130 formed by rays emitted from a plurality of light sources 111,122 to a plurality of light detectors 112, 121. The light detectors 112, 121 are arranged within a path corresponding one to one with a respective light source 111, 122, so that the conventional touch screen 100 determines the position selected by the user based on whether rays are detected on the lattice 130.

The light sources 111,122 are arranged on an adjacent surface positioned perpendicularly to the touch screen providing picture information, and the light detectors 112,121 are arranged so as to oppose the light sources 111,122, respectively. The light sources 111, 122 emit rays in the direction toward the corresponding light detectors 112, 121 so that the emitted rays form the lattice of rays 130. If the user puts a reflectable object, such as a part of the user's body or a pen, on a specific position on the lattice of rays 130, paths of the rays progressing to the corresponding light detectors 112, 121 are intercepted by the reflectable object. The result is that the rays that were intercepted by the reflectable object are not detected in the corresponding light detectors 112, 121.

However, conventional devices such as that shown and described in FIG. 1 have a problem in that, because the conventional optical type touch screen 100 has to use a plurality of light sources 111, 122 and light detectors 112, 121 in order to form the lattice of rays 130, there are a significant costs both in construction and subsequent consumption of electric power by such touch screens. In other words, the costs associated with the power required in order to drive the light sources 111, 122 and light detectors 112, 121 is large enough to render such touch screens as being cost prohibitive in many applications.

Another disadvantage of the conventional touch screens is that the resolution of the touch screens (a degree of precision thereof) are proportionate to the number of light sources and light detectors; thus the costs of manufacturing continue to increase with increased resolution, even when producing such touch screens on a large scale.

SUMMARY OF THE INVENTION

Accordingly, the present invention has been made in part to solve at least some of the above-mentioned problems occurring in the prior art. The present invention provides a touch screen that consumes less electric power than known heretofore and can be easily manufactured as compared with conventional touch screens.

In accordance with an aspect of the present invention, a touch screen includes picture means having an upper surface providing a user with picture information; a light source for outputting rays in directions parallel with the upper surface of the picture means on the upper surface of the picture means; an optical sensor for detecting rays reflected by the user on the upper surface of the picture means; and an optical filter positioned between the light source and the optical sensor. The rays emitted from the light source penetrate through the optical filter to the upper part of the picture means, and reflect the rays reflected on the upper surface of the picture means toward the optical sensor.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE INVENTION

Hereinafter, exemplary embodiments of the present invention will be described with reference to the accompanying drawings. The drawings have been provided for purposes of illustration and not for limitation. Furthermore, for the purposes of clarity and simplicity, a detailed description of known functions and configurations incorporated herein will be omitted as it may obscure the subject matter of the present invention with unnecessary detail.

Figure 1:
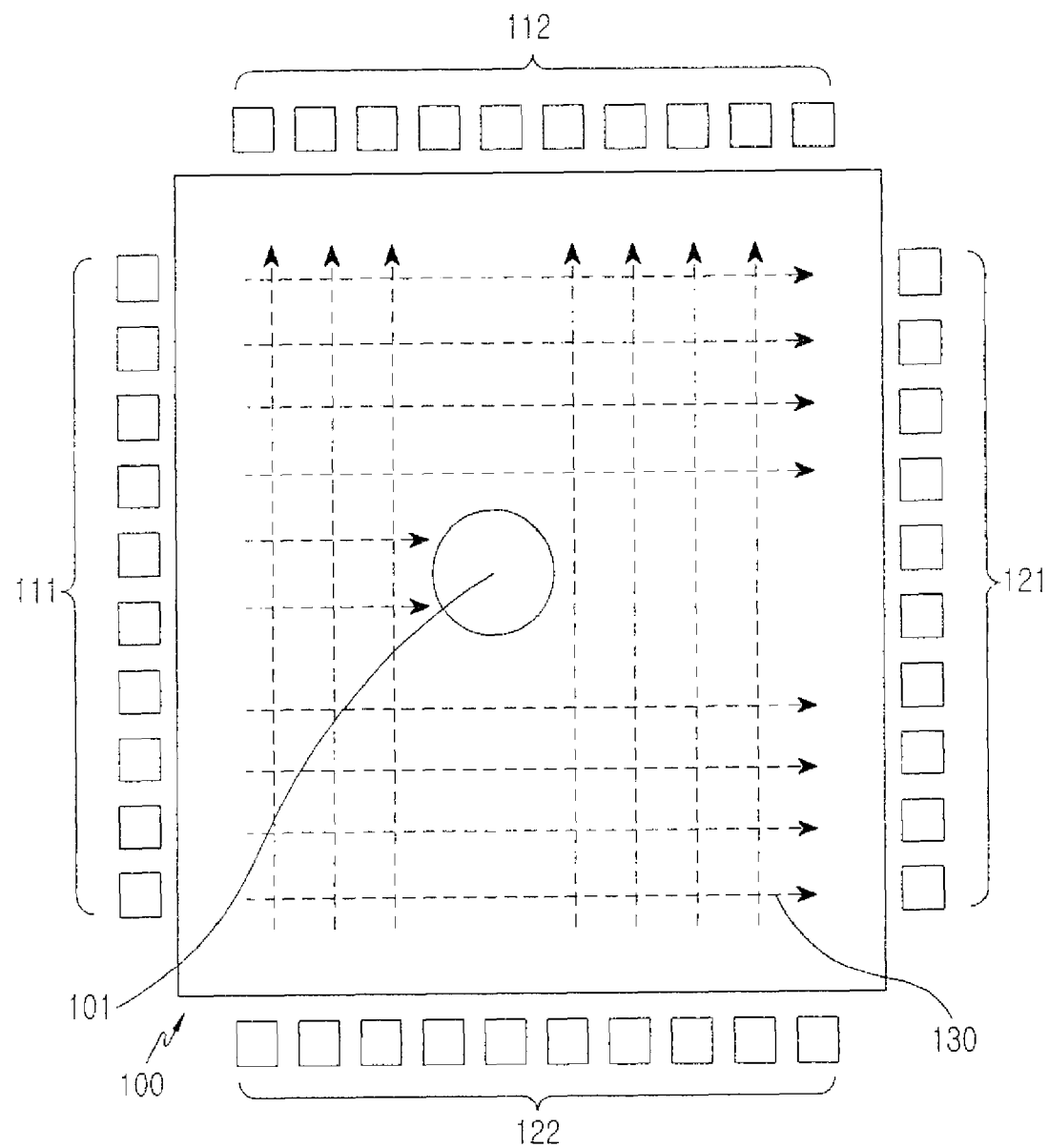
FIG. 1 is a schematic view showing a configuration of a conventional optical type touch screen.
Figure 2A:
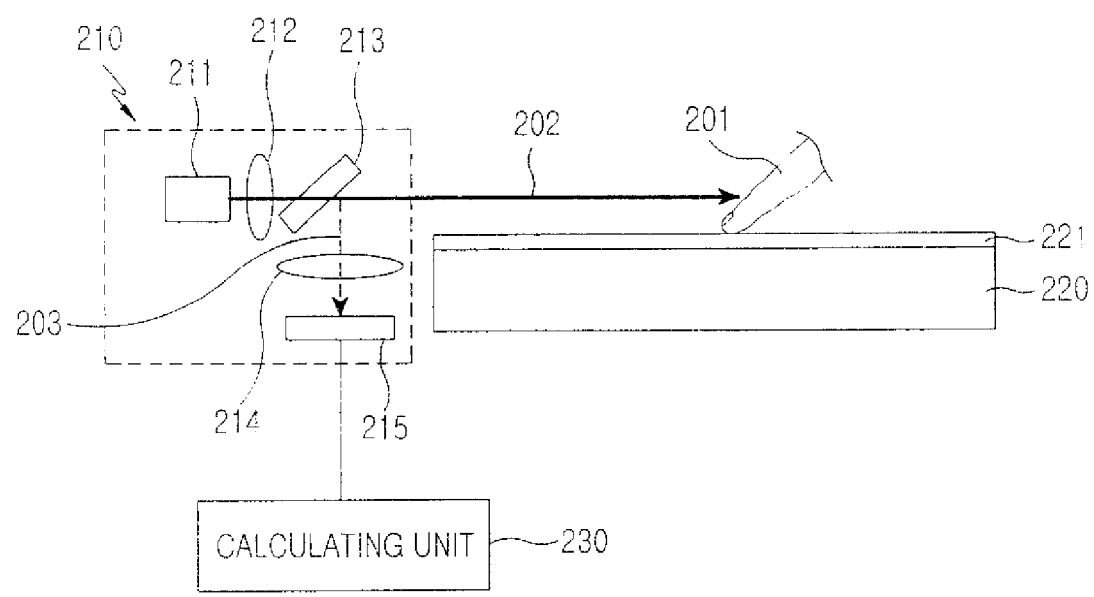
FIG. 2A is a sectional view of a touch screen according to an exemplary embodiment according to the present invention.
Figure 2B:
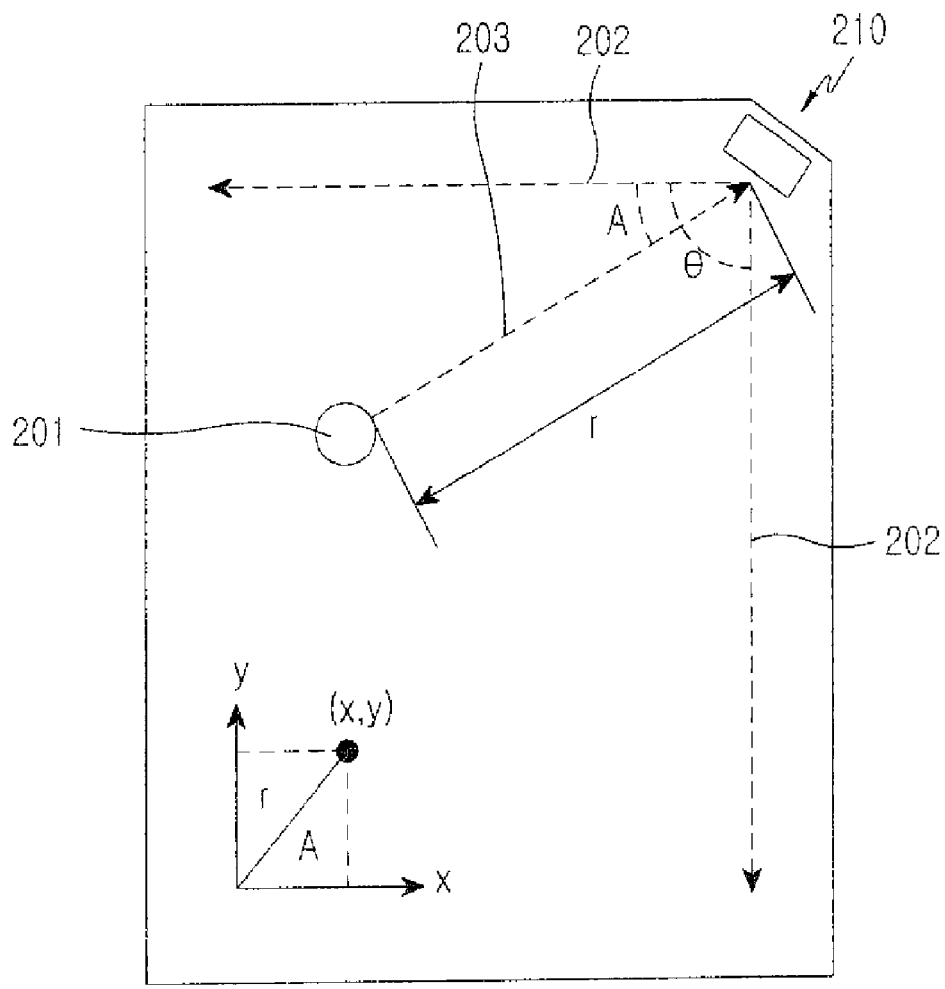
FIG. 2B is a plan view of the touch screen shown in FIG. 2A.

FIG. 2A illustrates a sectional view of a structure of a touch screen according to a first exemplary embodiment of the present invention, and FIG. 2B is a plan view of the touch screen shown in FIG. 2A. Referring to FIGS. 2A and 2B, the touch screen 200 includes picture means 220 for providing a user with pictorial information (i.e. a display), and an optical module 210 for emitting rays to an upper surface of the picture means 220 and detecting rays reflected by the user 201 (or an object arranged in lieu of a user or by a user). Particularly, the optical module 210 emits rays to the whole area of the upper surface of the picture means 220, and detects rays that are reflected by the user 201 to the optical module 210 among the emitted rays.

The picture means 220 may be comprised of many different forms including but not limited to a liquid crystal display, and may include an optical transparent protection film 221 layer, such as a polymer, etc., formed on the upper surface thereof. The picture means 220 is adapted to provide the user with picture information and/or provide menu buttons for the user's selection, key buttons for inputting characters or numbers, etc., in the forms of displayed pictures of the keys or buttons on the screen).

The optical module 210 may include a light source 211, an optical sensor 215, an optical filter 213, and first and second lens systems 212, 214. The light source 211 emits rays 202 in directions substantially parallel with the upper surface of the picture means 220. The emitted rays 202 have an emission angle (θ) covering the whole area of the upper surface of the picture means 220. The optical sensor 215 detects rays 203 reflected by the user from a reflectable object 201. The optical module 210 can be positioned on a single side of the touch screen.

The first lens system 212 is typically arranged between the light source 211 and the optical filter 213, and provides a function for diffusing rays, which are generated in the light source 211, at the predetermined angle (θ). The optical filter 213 functions to filters rays entering from the first lens system 212, and reflects at least a portion of the rays reflected off the reflectable object 201 toward the second lens system 214. The second lens system 214 collects the reflected rays into specific pixels of the optical sensor 215.

The light source 211 used may include a light source capable of generating rays having a predetermined wavelength, with rays in a visible wavelength band typically being an excluded because the rays have a superposition with picture information provided from the picture means 220 such that an unnecessary interference can be caused with a light source having a wavelength in the visible range. Therefore, it is preferable (but not required) that the light source 211 uses infrared rays that cannot be seen by the user, and which is in a wavelength band preferably used under usual sunlight and/or ambient light conditions.

The optical sensor 215 may be comprised of a CMOS or a CCD, etc., in which respective light detectors are arranged as forms of pixels 215-1~215-N. Moreover, the light detectors 215 detects rays among the rays emitted to the upper surface of the picture means 220, which are reflected by the reflectable object 201, that re-enter the optical sensor in pixels 215-1~215-N of a specific position of the optical sensor 215.

Still referring to FIGS. 2A and 2B, the rays detected in the optical sensor 215 are a basis for calculating a distance from the reflectable object 201 to the optical module by a calculating unit 230 using a measured delay time for the rays to be reflected from the reflectable object 201 to the optical module 210, and/or a size of a detected phase, and/or a phase delay, etc. The calculating unit 230 calculates the distance from the reflectable object 201 on the upper surface of the picture means 220 to the optical module 210, and thus a position of the reflectable object 201 based on characteristics of the rays obtained by reflection from the reflectable object 201.

Figure 3A:
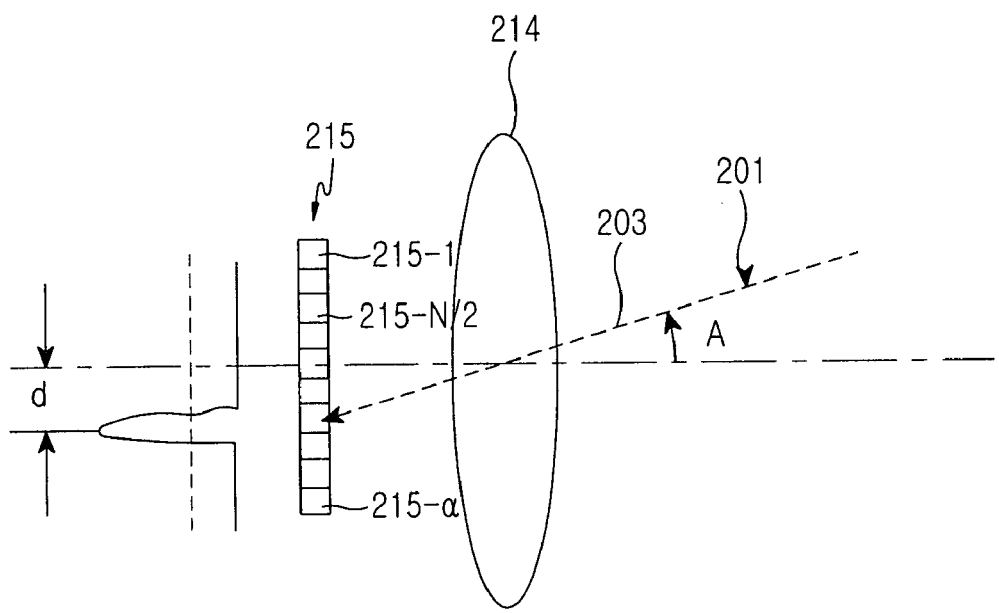
FIG. 3A is a view illustrating a principle of calculating a position (r) selected by a user on the touch screen by using incidence angles of rays entering an optical sensor shown in FIG. 2B.

FIG. 3A is a view illustrating a typical operational principle of calculating the position (r) selected by the user on the touch screen according to an exemplary embodiment of the present invention. Through the use of an incidence angle of the ray entering the optical sensor 200 (shown in FIG. 2B) the position (r) can be calculated. Referring to FIG. 3A, it can be shown that pixels 215-1~215-N of the optical sensor 215, which receive rays 203 reflected from the reflectable object 201, are different depending on the position of the reflectable object 201, and it can be also shown that an incidence of angle (A) of the rays 203 with respect to an optic axis can be determined by the receipt of rays 203 by the particular pixels from the group of pixels 215-1~215-N. In other words, if the touch screen 200 is defined by X axis and a Y axis, positions of respective axes are defined by equations (1) and (2) below:

$$x = r \cos(A) \quad (1)$$

$$y = r \sin(A) \quad (2)$$

In equations (1) and (2), x and y in equations (1) and (2) refer to the coordinate systems shown in FIG. 3, and r refers to the distance from the optical module 210 to the reflectable object 201 reflecting rays. Additionally, θ refers to an emission angle of rays 204 emitted from the light source 211. Furthermore, "A" can refer to an angle of the reflected rays 203 with respect to the x axial, or an angle of the rays 203 entering the pixels 215-1~215-N with respect to the optical axis. More particularly, the above-described angle A of the rays 203, which is reflected to the optical sensor 215 with respect to the optical axis, can be calculated according to positions of the pixels 215-1~215-N in which the rays enter, with respect to the optical axis. "A" can be denoted as in equation (3) below from a pixel 215-1~215-N having the greatest power of output, among all pixels 215-1~215-N of the optical sensor 215.

$$A = \alpha \tan(\alpha/f) \quad (3)$$

In equation (3), α refers to a distance between the pixel 215-1~215-N having the greatest output power and a central pixel 215-N/2, and f refers to a focal distance of the second lens system 214. With reference to equation (3), an angle A can be determined because a size of the corresponding pixel and the focal distance of the second lens system 214 are known.

In above-described equations (1) and (2), A refers to a pixel in which a ray enters, an optical axis according to the pixel in which the ray enters, and an angle of the ray. Also, A can be determined according to the position of the pixel having the greatest power of output. Therefore, the position (r) of the reflectable object 201, which is necessary to solve the above-described equations (1) and (2), can be calculated by the below-schemes based on phases of the rays (delay time), intensity of the rays, and/or sizes of the rays, etc.

There are a number of ways of detecting the distance from the optical module 210 to the reflectable object 201 in accordance with the present invention. For example, the phases of waveforms of the rays emitted from the light source 211 are compared with those of the rays reflected from the reflectable object 201, and r is calculated through the delay time taken for the rays to be reflected from the reflectable object 201 and in turn into the optical module 210.

Figure 3B:
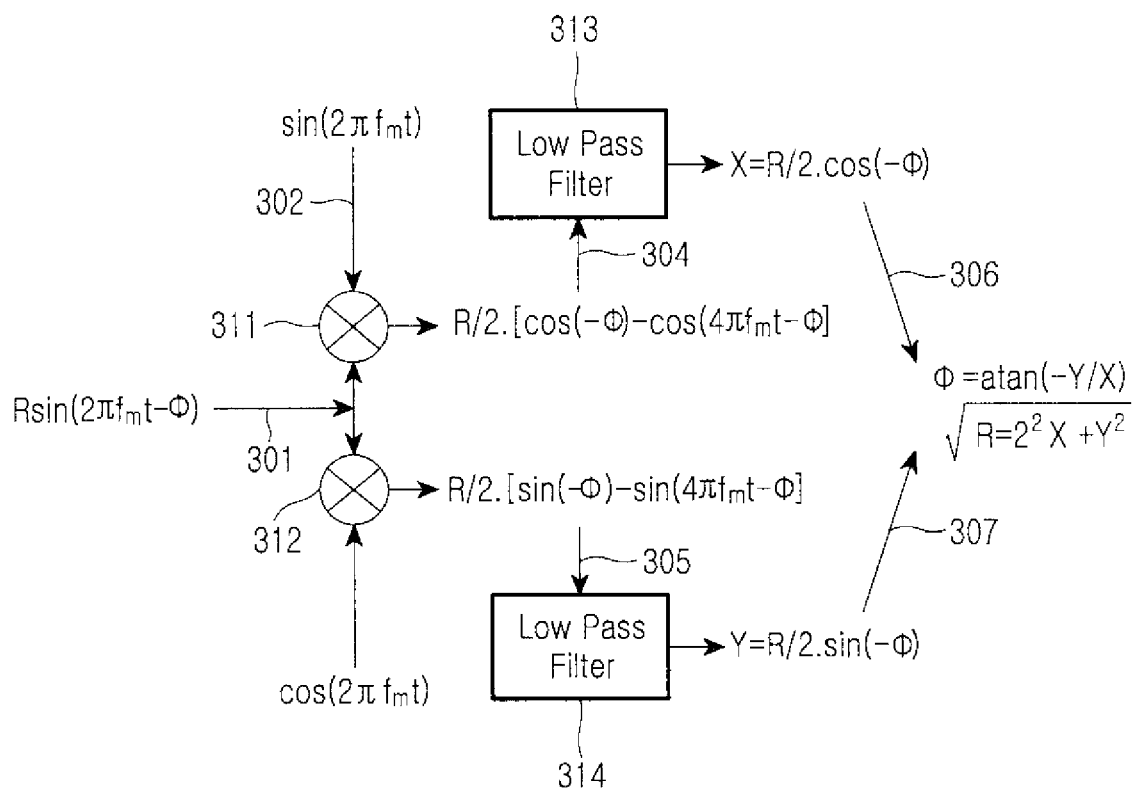
FIG. 3B is a view illustrating a principle of calculating the selected position (r) on the touch screen by using optical phases of incident rays entering the optical sensor shown in FIG. 2A.

FIG. 3B illustrates a principle of calculating the position (r) on the touch screen by using an optical phase of a ray entering to the optical sensor 210 shown in FIG. 2B. The principle will now be described with reference to FIG. 3B.

$$\sin(2\pi f_m t) \quad (4)$$

Equation (4) refers to a function 302 having a waveform of a ray generated in the light source 211, f refers to a frequency of the ray generated in the light source, and m refers to the degree of the ray.

$$R(t) = \sin(2\pi f_m - \phi) = \sin\left(2\pi\left(t - \frac{2r}{c}\right)\right) \quad (5)$$

Equation (5) refers to a ray 301 reflected from the reflectable object 201, wherein, t refers to time, and fm refers to a frequency of the reflected ray 203 which is directed to the optical sensor 215 via optical filter 213. Also, r refers to a progressive distance of the ray, particularly, from a point in which the ray 202 emitted from the optical module 210 is reflected from the reflectable object 201, to a point in which the reflected ray 203 enters the optical sensor 215 (a position of the reflectable object on the picture means). Finally, θ refers to a phase delay of the reflected ray 203.

With reference to FIG. 3B, the above-described phase delay algorithm will be now discussed in more detail. The ray 301 reflected from the reflectable object 201, as shown in FIG. 3B, which is indicated by equation (5) and equation (6) below, can be determined if the reflected ray 301 is multiplied by signals having a phase difference of 90 degrees in couplers 311 and 312. In other words, if a ray emitted from the light source has a wave form as expressed in equation (4), then a signal 304 can be determined from an equation, such as equation (6) below, by multiplying the ray 301 (equation (5)) reflected off the reflectable object 201 by an emitted ray 302. Further, if equation (7) shown herein below, is used with a signal which has a phase difference of 90 degrees compared with a signal of equation (4), is multiplied by equation (5), a signal 305 of equation (8) can be determined.

$$\theta \text{ Signal } 304 = \frac{R}{2}[\cos(-\phi) - \cos(4\pi f_m t - \phi)] \quad (6)$$

$$\text{Phase difference} = \cos(4\pi f_m) \quad (7)$$

$$\theta \text{ Signal } 305 = \frac{R}{2}[\sin(-\phi) - \sin(4\phi f_m t - \phi)] \quad (8)$$

Signals as in equation (6) and equation (8) pass through a low pass filters 313, 314 so that a band including an $f_m$, particularly, a high frequency element, is removed and signals 306 and 307 of equation (9) below are obtained.

$$X = \frac{R}{2}[\cos(-\phi)] \quad (9)$$

$$Y = \frac{R}{2}[\sin(-\phi)]$$

In equation (9), all of X, Y include only an element of a phase delay so that the total phase delay can be calculated based on a proportion of two signals, and the distance regarding the reflectable object (as in equation (5)) can be calculated. The phase delay can be calculated from equation (10) below using the values of X and Y solved for in equation (9).

$$\phi = a\,\tan\!\left[\frac{-X}{Y}\right] \quad (10)$$

Figure 4A:
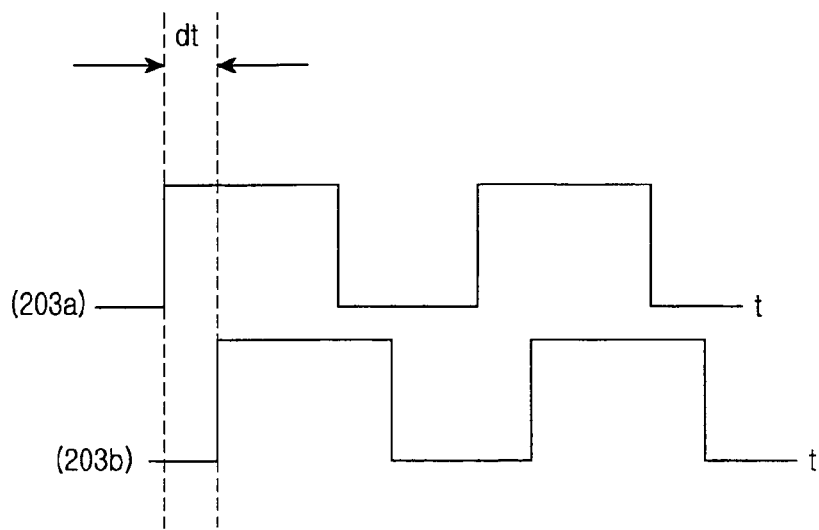
FIGS. 4A to 4C are views illustrating a principle of calculating the selected position (r) on the touch screen by using a time difference between incident rays entering the optical sensor shown in FIG. 2A.
Figure 4B:
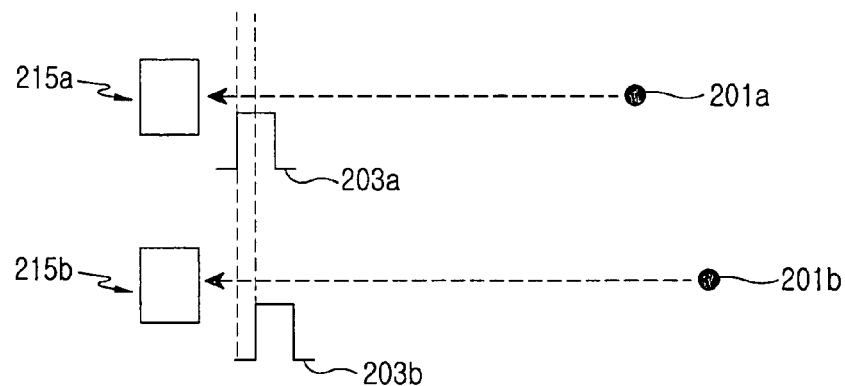
Figure 4C:
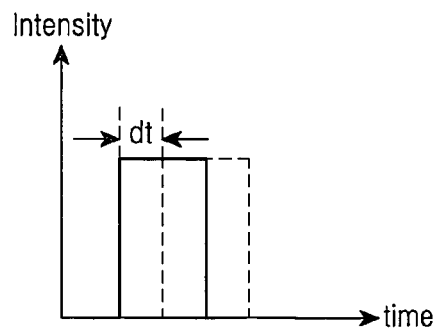

FIGS. 4A to 4C are views that illustrate the principle of calculating the selected position (r) on the touch screen by using time differences between incident rays entering the optical sensor 215 shown in FIG. 2A. Particularly, FIG. 4B is a view showing an example of a time difference in order to illustrate the time difference between the rays (201a, 201b) detected in the optical sensor 215 depending on the position of the reflectable object 201.

Still referring to FIGS. 4A and 4B, a ray 203a is reflected from the reflectable object 201 positioned in a point 201a on the picture means 220 and a ray 203b is reflected from the reflectable object 201 positioned in a point 201b on the picture means 220 and can enter optical sensors 215a and 215b, respectively, having a time difference there between. The distance (r) from the optical module 210 to the reflectable object 201 can be obtained by multiplying the delay time by the speed of light (3×10⁸ m/s) according to the above-described scheme using the delay time depending on the distance (r).

Figure 5A:
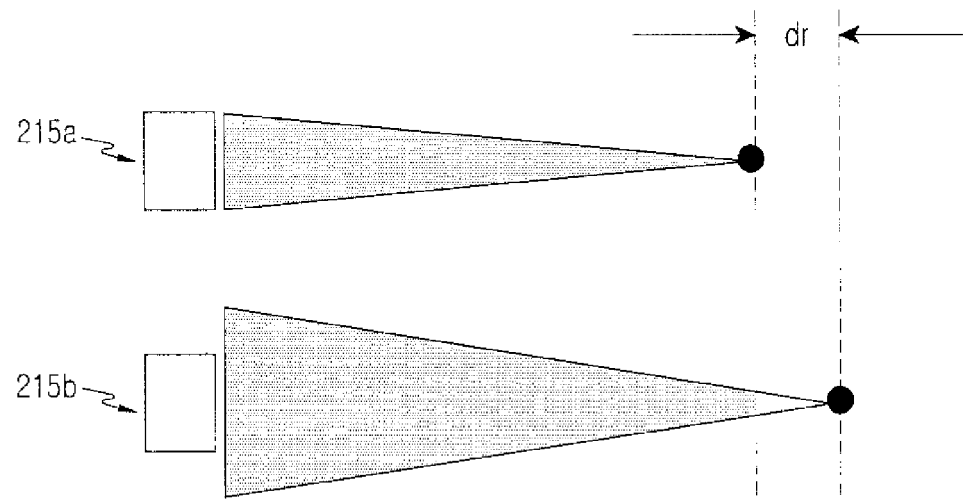
FIGS. 5A and 5B are views illustrating a principle of calculating the selected position (r) on the touch screen by using the intensity of the rays entering the optical sensor shown in FIG. 2A.
Figure 5B:
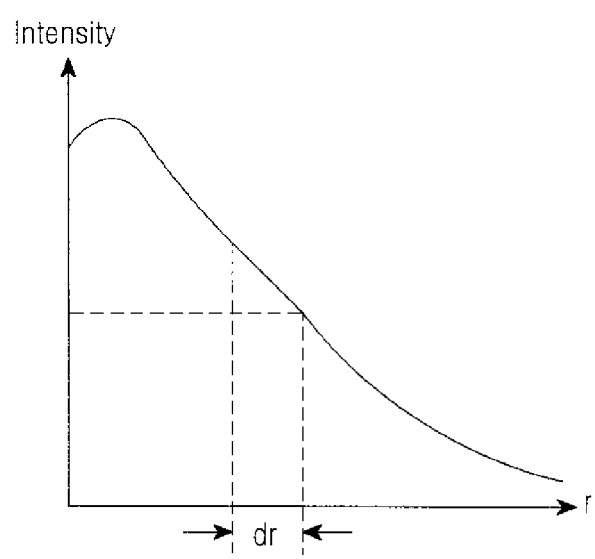

FIGS. 5A and 5B are views illustrating the principle of calculating the selected position (r) on the touch screen, in which the position is calculated by using the intensity of rays entering the optical sensor 215 shown in FIG. 2A. FIG. 5A is a schematic view showing a comparison between optical quantities of respective rays entering each optical sensors 215a and 215b, in which the respective rays are reflected off the reflectable object 201 and received at respective positions which are different from each other. FIG. 205B is a graph showing the change of an optical quantity of rays detected in the optical sensor depending on the position of the reflectable object 201.

Figure 6A:
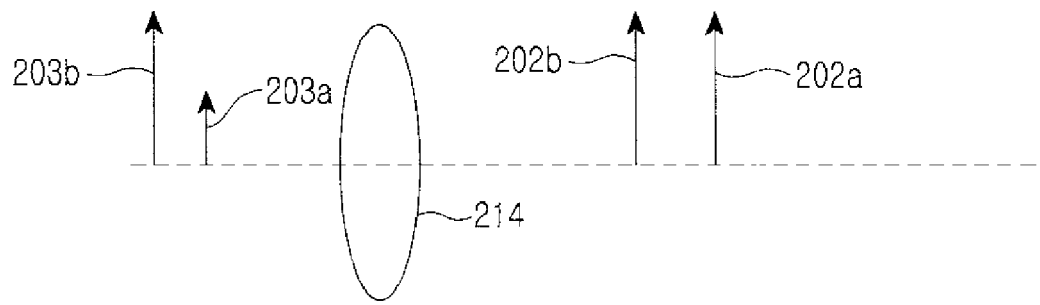
FIGS. 6A and 6B are views illustrating a principle of calculating the selected position (r) on the touch screen by using a size of a phase in the optical sensor shown in FIG. 2A.
Figure 6B:
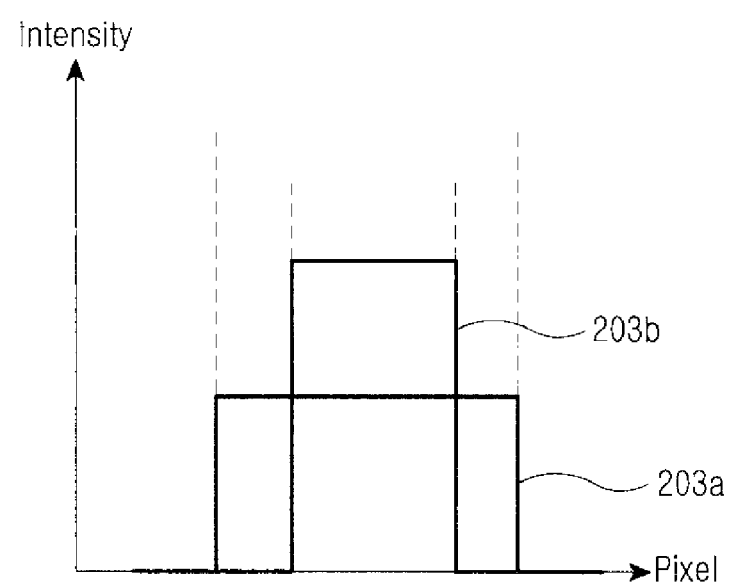

FIGS. 6A to 6B are views illustrating the principle of calculating the selected position (r) on the touch screen, in which the position is calculated by using a size of an optical phase in the optical sensor 215 shown in FIG. 2A.

In the case that a distance from the second lens system 214 to the optical sensor 215 is fixed, sizes of phases obtained from the various rays entering the optical sensor are different from each other depending on the position (r) of the reflectable object. Particularly, as shown in FIGS. 6A and 6B, a phase 203a from a reflectable object 202a positioned in a further distance from the second lens 214 is bigger than a phase 203b from a reflectable object 202b positioned in relatively close distance.

Figure 7A:
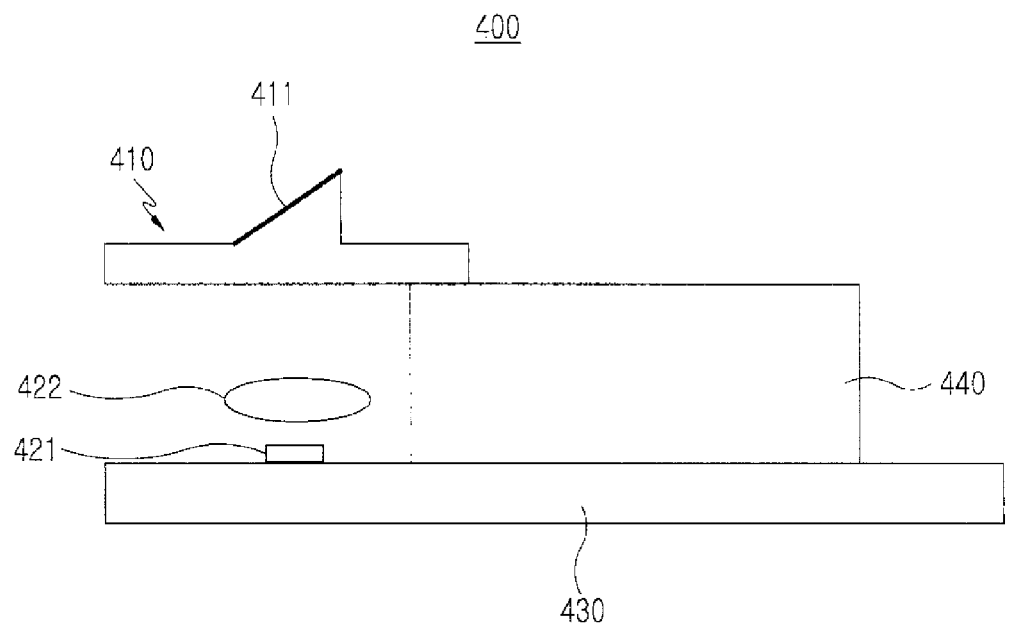
FIGS. 7A and 7B are views illustrating the touch screen according to a second exemplary embodiment according to the present invention.
Figure 7B:
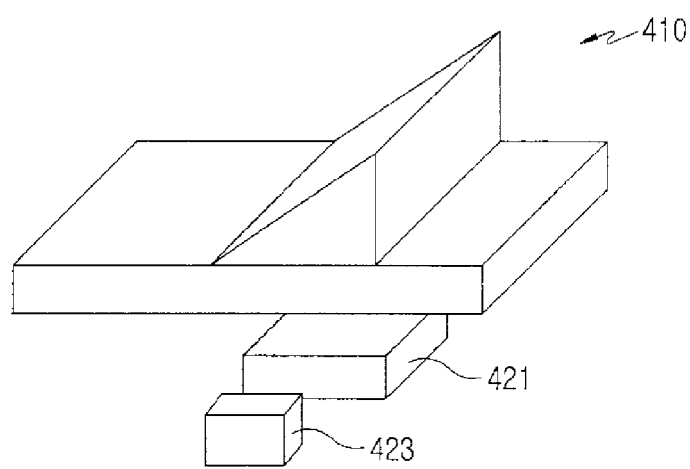

FIGS. 7A and 7B are views illustrating the touch screen according to a second exemplary embodiment according to the present invention. Referring to the example shown in FIGS. 7A and 7B, a touch screen 400 includes a submount 430, picture means 440 having an upper surface thereof providing the user with picture information, a light source 423 for generating rays, an optical sensor 421 for detecting rays reflected by the user in the picture means 440, an optical filter 410 positioned to face the light source 423 and the optical sensor 421, the rays being emitted from the light source 423 being penetrated through the optical filter 410 to the upper surface of the picture means 440, and reflecting the rays, which are reflected from the upper surface of the picture means 440 toward the optical sensor 421, and a lens system 422 positioned between the optical sensor 421 and the optical filter 410. The picture means 440 may use, for example, a liquid crystal display (LCD), but can use many other types of displayed known in the art.

Still referring to FIGS. 7A and 7B, the optical sensor 421 may use an image sensor such as a CMOS or a CCD, etc., in which a plurality of light detectors are integrated as respective pixels. The lens system 422 may include at least one lens, and can collect the rays reflected from the upper surface of the picture means 440 that are directed to corresponding pixels of the optical sensor 421.

The optical filter 410 has a slanted surface 411 formed on a part of the upper surface thereof, which corresponds to the optical sensor 421 and the light source 423, and the slanted surface 411 has a reflection layer which can reflect rays generated in the light source 423.

Figure 8A:
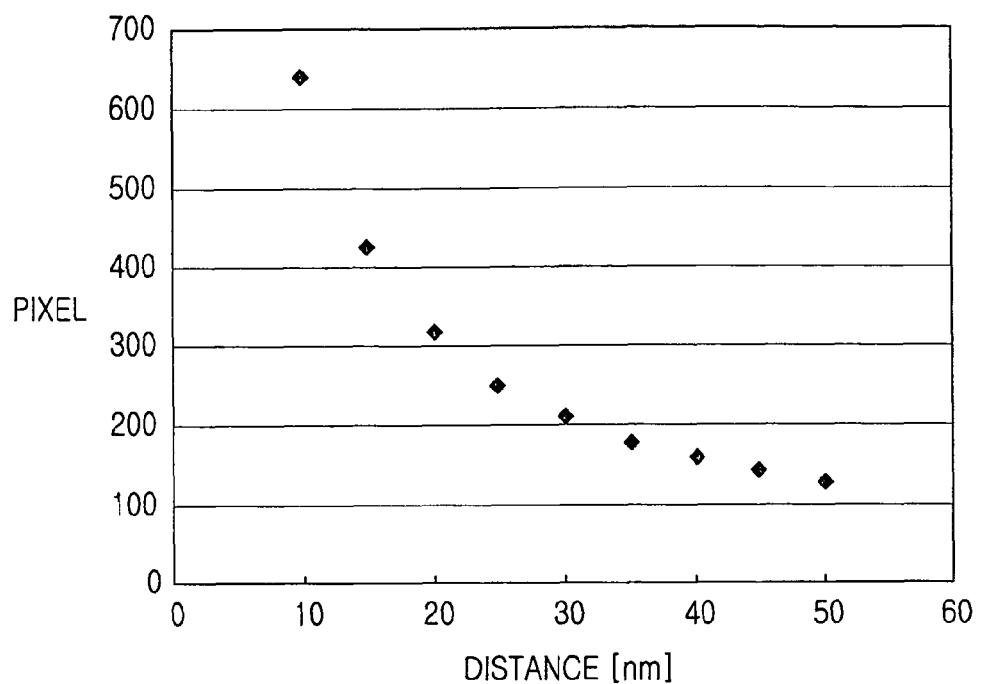
FIG. 8A is a graph illustrating the relationship between a distance from a reflectable object to the optical module and the number of pixels according to the distance.
Figure 8B:
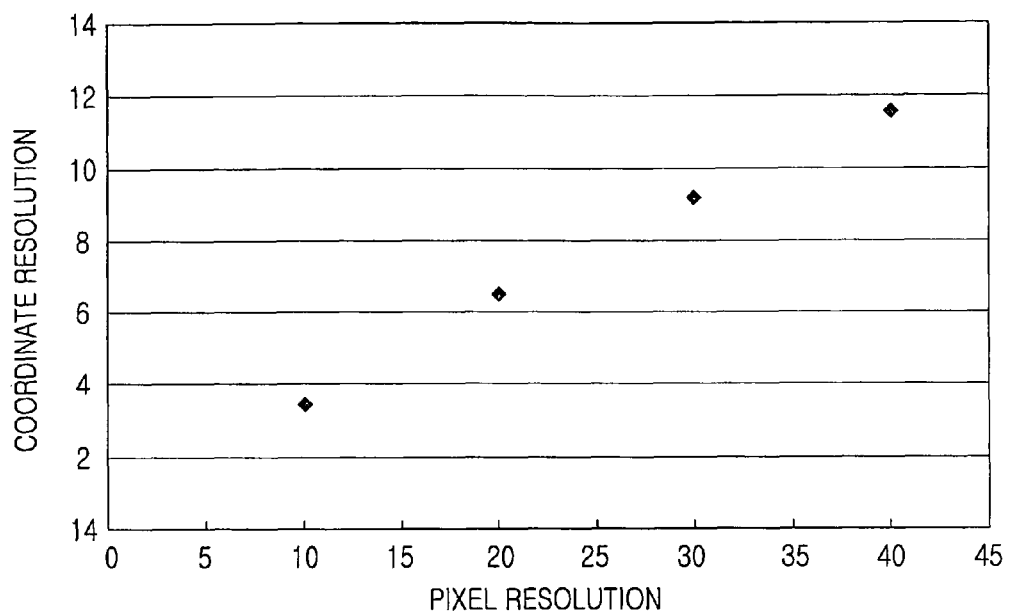
FIG. 8B is a graph illustrating a pixel resolution and a coordinate resolution of a touch screen according to the present invention.

FIG. 8A is a graph illustrating the relationship between the distance regarding the reflectable object and the number of pixels depending on the distance therefrom, and FIG. 8B is a graph illustrating a pixel resolution and a coordinate resolution. In data measurement of the graphs of FIGS. 8A and 8B, a touch screen was used, which included a lens system having a focal distance of 3.7 mm, an optical sensor of VAG (640× 480), and picture means having a size of 6 cm×4 cm (2.5"). In the case that the reflectable object is positioned closely to a camera as shown in FIG. 8A, a size of an image photographed by the sensor is big so that an output is obtained in a large portion of the pixels. The size of the image becomes smaller as the reflectable object moves away from the camera, and the number of pixels from which the output can be obtained decreases.

Therefore, by comparing sizes of photographed images, particularly, the number of pixels in which the output is detected, with each other, the distance regarding the reflectable object can be calculated. However, the relationship between the distance regarding the reflectable object and the number of pixels is a nonlinear function so that, as the distance increases, the variation of the number of pixels also decreases. Particularly, as the distance increases, a distance resolution decreases so as to make it difficult to measure the exact distance. Particularly, it is more difficult to detect the movement of the reflectable object in a position which is further from the optical sensor than in a position which is closer to the optical sensor.

Referring to FIG. 8B, it is known that the distance resolution is changed depending on a resolution of the camera (a detection power of pixels depending on the distance). The above-described distance resolution is based on a standard case that the reflectable object is positioned in the farthest distance, since it is known that the distance resolution in the farthest distance is the smallest as shown in FIG. 8A.

FIG. 8B is a graph illustrating the resolution of the optical sensor and the distance resolution depending on the resolution of the optical sensor, based on the standard case that the reflectable object is positioned in the farthest distance. Particularly, FIG. 8B is a graph showing the performance of the optical sensor (the pixel resolution) and a corresponding distance resolution in a position in which it is difficult to detect the movement of the reflectable object, the pixel resolution is in proportion to an optical system included in the optical sensor, particularly, the number of pixels, and, as the number of pixels increases, the pixel resolution also increases.

Referring to a specific example, in a case where the optical sensor has an angle resolution of 5 degrees and can divide 10 number of pixels, the optical sensor can detect the change of an output of 10 number of pixels according to the movement of the reflectable object, and detect the movement of the reflectable object within a range of 3.5 mm. In a case that the optical sensor in the above-described example is applied to picture means having a size of 25", if a picture, which is implemented, is divided into visual segments, the picture can be divided into 17×11 number of segments. Since a key pad, which is generally applied to portable terminals, includes 12 buttons, particularly, 3×4 number of segments, the touch screen according to the present invention can have button functions which are more than 15 times that of the key pad.

In the present invention, the optical type touch screen can be implemented by one light source. Particularly, the touch screen according to the present invention can also be implemented by two or more light sources and two or more light detectors. Due to this fact, assembly operation, such as an array along an optical axis, can be simplified. Furthermore, in the present invention, there is an advantage in that the number of parts is minimized so that consumption of electric power can be minimized, and it can be provided at a low-price. Additionally, in the present invention, it is easy to cope with inferior productions.

While the invention has been shown and described with reference to certain exemplary embodiments thereof, it will be understood by those skilled in the art that various changes in form and details may be made therein without departing from the spirit and scope of the invention as defined by the appended claims. For example, the finger or object does not have to necessarily touch the surface of the screen, but merely be adjacent thereto so that the emitted waves are reflected.

What is claimed is:

1. A touch screen comprising:
   picture means having an upper surface providing picture information; and
   an optical module only positioned on a single side of the picture means for directly emitting invisible rays substantially parallel to the upper surface of the picture means without moving the optical module or a mirror, and for detecting invisible rays reflected by an object,
   wherein the optical module comprising:
   a light source generating invisible rays;
   a first lens system positioned between the light source and an optical filter, the first lens system diffusing invisible rays generated in the light source so that the invisible rays have an emission angle covering whole area of the picture means;

the optical filter positioned to face the light source and an optical sensor, invisible rays emitted from the light source being penetrated through the optical filter to the upper surface of the picture means, and reflecting invisible rays being reflected off the object on the upper surface of the picture means, and the reflecting invisible rays reflected off the object being provided directly into the optical filter; and the optical sensor for detecting invisible rays reflected by the object on the upper surface of the picture means that is in the path of a least a portion of the invisible rays generated by the light source.

2. The touch screen as recited in claim 1, wherein the picture means comprise a liquid crystal display.

3. The touch screen as recited in claim 1, wherein the optical module further comprises a second lens system positioned between the optical filter and the optical sensor, the second lens system collecting the invisible rays entering the optical sensor from the optical filter.

4. The touch screen as recited in claim 1, wherein the optical sensor comprises an image sensor having a form in which a plurality of light detectors are arranged as respective pixel units.

5. The touch screen as recited in claim 1, further comprising:
a second lens system positioned between the optical filter and the optical sensor, the second lens system collecting the invisible rays entering the optical sensor from the optical filter; and
a calculating unit for calculating a position of the object on the upper surface picture means from the reflected invisible rays detected in the optical module,
wherein the calculating unit calculates the position of the object based on a distance between a first pixel of the optical sensor corresponding to an optical axis of the second lens system and a second pixel of the optical sensor in which the reflected invisible rays enter.

6. The touch screen as recited in claim 1, further comprising a calculating unit for calculating a position of the object on the upper surface picture means from the reflected invisible rays detected in the optical module.

7. The touch screen as recited in claim 6, wherein the calculating unit calculates a position of the object based on an incidence angle of the reflected invisible rays.

8. The touch screen as recited in claim 6, wherein the calculating unit calculates the position of the object based on $x=r\cos(A)$, wherein X and Y are random coordinates perpendicular with each other on the touch screen, r is a distance from a reflectable object to the optical module, and A is an angle with respect to an optical axis of a invisible ray reflected in the optical module.

9. The touch screen as recited in claim 6, wherein the calculating unit calculates the position of the object based on $y=r\sin(A)$, wherein X and Y are random coordinates perpendicular with each other on the touch screen, r is a distance from a reflectable object to the optical module, and A is an angle with respect to an optical axis of an invisible ray reflected in the optical module.

10. The touch screen as recited in claim 6, wherein the position of the object indicates a portion of the picture information selected.

11. A touch screen comprising:
picture means having an upper surface providing a user with picture information;
a light source only positioned on a single side of the picture means for generating and directly emitting invisible rays substantially parallel to the upper surface of the picture means without moving the optical module or a mirror;
an optical sensor for detecting invisible rays reflected by an object on the upper surface of the picture means that is in the path of a least a portion of the invisible rays generated by the light source;
an optical filter positioned to face the light source and the optical sensor, invisible rays emitted from the light source being penetrated through the optical filter to the upper surface of the picture means, and reflecting invisible rays being reflected off an reflectable object on the upper surface of the picture means, and the reflecting invisible rays reflected off the reflectable object being provided directly into the optical filter; and
a first lens system positioned between the light source and the optical filter, the first lens system diffusing invisible rays generated in the light source so that the invisible rays have an emission angle covering whole area of the picture means.

12. The touch screen as recited in claim 11, further comprising a second lens system positioned between the optical filter and the optical sensor, the second lens system collecting the invisible rays entering the optical sensor from the optical filter.

13. The touch screen as recited in claim 11, wherein the optical filter comprises a slanted surface formed on a part of its upper surface, wherein the upper surface corresponds to the optical sensor and the light source.

14. The touch screen as recited in claim 11, further comprising:
a second lens system positioned between the optical filter and the optical sensor, the second lens system collecting the invisible rays entering the optical sensor from the optical filter; and
a calculating unit for calculating a position of the object on the upper surface picture means from the reflected invisible rays detected in the optical module,
wherein the calculating unit calculates the position of the object based on a distance between a first pixel of the optical sensor corresponding to an optical axis of the second lens system and a second pixel of the optical sensor in which the reflected invisible rays enter.

15. A method for providing a touch screen, comprising the steps of providing picture information on an upper surface of a touch screen;
directly emitting, by a light source only positioned on a single side of the touch screen, invisible rays in directions substantially parallel with the upper surface of the touch screen, the invisible rays being penetrated through an optical filter and diffused into the whole area of the upper surface of the touch screen without movement; and detecting, by an optical sensor, invisible rays reflected by an object adjacent the upper surface of the touch screen in a path of at least a portion of the parallel rays, the emitted invisible rays being reflected off an reflectable object on the upper surface of the touch screen, and the reflected invisible rays reflected off the reflectable object being provided directly into the optical filter, and the provided invisible rays being reflected into the optical sensor by the optical filter, wherein the object is positioned to select a portion of the picture information provided on the upper surface of the touch screen.

16. The method according to claim 15, further comprising the step of calculating a position of the object on the upper surface of the touch screen from the reflected invisible rays that were detected.

17. The method according to claim 16, wherein the calculating of the position of the object is based on an incidence angle of the reflected invisible rays.

18. The method according to claim 16, further comprising the step of calculating a position of the object on the upper surface of the touch screen from the reflected invisible rays that were detected,
wherein the position of the object is calculated based on a distance between a first pixel of the optical sensor positioned at a center of the optical sensor and a second pixel of the optical sensor in which the reflected invisible rays enter.

* * * * *